(12) United States Patent
Janicke-Tuff et al.

(10) Patent No.: US 12,510,193 B2
(45) Date of Patent: Dec. 30, 2025

(54) REMOTE CONTROLLED INTERLOCKING HYGIENIC CLAMP

(71) Applicants: William Gravier Janicke-Tuff, Saint Paul, MN (US); Lindsey Jo Janicke-Tuff, Saint Paul, MN (US)

(72) Inventors: William Gravier Janicke-Tuff, Saint Paul, MN (US); Lindsey Jo Janicke-Tuff, Saint Paul, MN (US)

( * ) Notice: Subject to any disclaimer, the term of this patent is extended or adjusted under 35 U.S.C. 154(b) by 0 days.

(21) Appl. No.: 18/607,536

(22) Filed: Mar. 17, 2024

(65) Prior Publication Data
US 2025/0198551 A1 Jun. 19, 2025

Related U.S. Application Data

(60) Provisional application No. 63/610,733, filed on Dec. 15, 2023.

(51) Int. Cl.
*F16L 23/10* (2006.01)
*F16L 23/00* (2006.01)
*F16L 37/00* (2006.01)

(52) U.S. Cl.
CPC .............. *F16L 23/003* (2013.01); *F16L 23/10* (2013.01); *F16L 37/002* (2013.01)

(58) Field of Classification Search
CPC ......... F16L 33/12; F16L 37/002; F16L 23/10; F16L 23/08; F16L 23/003; F16L 33/227; F16L 37/084
See application file for complete search history.

(56) References Cited

U.S. PATENT DOCUMENTS

| | | | |
|---|---|---|---|
| 167,262 A * | 8/1875 | Lewis | F16L 23/10 285/253 |
| 1,910,161 A * | 5/1933 | Harrington | E21B 33/06 285/391 |
| 4,116,015 A * | 9/1978 | Duncan | E21B 19/004 81/57.2 |
| 4,515,182 A * | 5/1985 | LeDevehat | F16L 55/1007 285/1 |
| 5,730,471 A * | 3/1998 | Schulze-Beckinghausen | B25B 5/147 285/912 |
| 6,022,454 A * | 2/2000 | Fetzer | C10B 33/006 202/241 |

(Continued)

FOREIGN PATENT DOCUMENTS

DE 3309453 A1 * 4/1984
DE 3926432 A1 * 2/1991

(Continued)

*Primary Examiner* — Zachary T Dragicevich
*Assistant Examiner* — James A Linford (57) ABSTRACT

A hygienic clamp coupler is designed for the secure connection of flagged piping sections in fluid systems. The coupler features an innovative automatic locking mechanism and a remote-controlled unlocking mechanism, enhancing safety by mitigating the risk of accidental disassembly or exposure to dangerous energized fluids. Distinguished features of the coupler are its elongated wingnut, equipped with an axially elongated ratchet gear, and an embedded linear actuator that functions as a ratchet pawl, facilitating the automatic locking mechanism. The activation of the linear actuator allows for the controlled disengagement of the ratchet components, enabling the operator to remove the clamp.

3 Claims, 8 Drawing Sheets

(56) References Cited

U.S. PATENT DOCUMENTS

| | | |
|---|---|---|
| 8,220,113 B2 | 7/2012 | Morton |
| 2006/0197344 A1 | 9/2006 | Henry |
| 2009/0208277 A1 | 8/2009 | Werth |
| 2012/0227221 A1 | 9/2012 | Whitaker |
| 2014/0102711 A1* | 4/2014 | Hestetun .................. F16L 1/26 166/344 |
| 2020/0080675 A1 | 3/2020 | White et al. |
| 2021/0247008 A1 | 8/2021 | Sillitoe et al. |

FOREIGN PATENT DOCUMENTS

| | | | | |
|---|---|---|---|---|
| GB | 1472750 A | * | 5/1977 | .............. F16L 23/06 |
| GB | 2361753 A | * | 10/2001 | .............. F16L 23/10 |

* cited by examiner

REMOTE CONTROLLED INTERLOCKING HYGIENIC CLAMP

CROSS-REFERENCE TO RELATED APPLICATIONS

This application claims the benefit of U.S. Provisional Patent Application No. 63/610,733 filed on Dec. 15, 2023.

FIELD OF THE DISCLOSURE

This disclosure relates to connectors in fluid systems, with a specific emphasis on hygienic interfaces engineered for the unification of pipelines.

BACKGROUND OF THE DISCLOSURE

In sectors such as food processing, dairy production, beverage manufacturing, pharmaceutical development, and biotechnology, the usage of hygienic couplings is indispensable. The operational prerequisites in these domains mandate that fluid conduits and connectors be designed to mitigate the propensity for fluid entrapment between the abutting pipe flanges and curtail the likelihood of bacterial proliferation and environmental contamination. The imperative specifications of fluid conduits and connectors circumscribe the selection of materials, surface finishing techniques, and geometric configurations.

Predominantly, hygienic pipelines and connectors are fabricated from non-corrosive metals such as stainless steel and finished to achieve an exceedingly smooth surface accepted by standard grading practices. Fabrication of hygienic clamps is achieved by, but not limited to, casting and/or machining. Gaskets placed between the couplings are manufactured from specialized polymers, including but not limited to PTFE, Nylon, or Teflon.

Regarding conventional hygienic fluid connectors, grooved manual clamp rings serve as the primary mechanism for affixing components securely. The standard TRI-CLAMP design is an example of a grooved manual clamp ring, incorporating both upper and lower grooved ring sections adjoined by a hinge enabling the opening and closing of the assembly. To consummate the connection, first, the flanged pipe sections are placed adjacently against each other with an intervening gasket. Second, the clamp is opened and subsequently wrapped around the flanged ends and the intervening gasket, fitting into the inner grooves of the upper and lower clamp sections. A tightening bolt, hinged to the lower section of the clamp, is swung into a channel in the upper ring section of the clamp. A wingnut is screwed onto the tightening bolt and must be rotated through several revolutions until the requisite clamping pressure is attained.

In the aforementioned industrial sectors, there may be several piping sections and circuits that may need to be disconnected, connected, and frequently reconfigured, requiring the constant use of hygienic clamps and unintentionally creating the added risk of opening in-use pipes that carry pressurized, and/or high temperature, and/or chemically energized liquids that are often dangerous. For example, in the dairy sector, piping often transports fluid at dangerous temperatures above 250 degrees Fahrenheit. Energized liquid fluids and/or energized atmospheric fluids may be present in the pipes, creating a risk potential of released energy for the operator opening the clamps.

Due to the aforementioned risks, there are several disadvantages to the known said standard hygienic clamp design. First, the clamp can be opened by personnel even if the pipe contains dangerous energized fluids such as, but not limited to, fluids that possess pressurized, chemical, and thermal energies. Secondly, the clamp can become loose unintentionally from, but not limited to, vibration or unintended contact.

SUMMARY OF THE DISCLOSURE

The disclosed exemplary embodiments introduce a novel hygienic clamp coupler, specifically designed for secure and efficient connection of flanged piping sections in various industrial fluid circuits. This innovative clamp addresses critical safety concerns prevalent in sectors such as food processing, dairy production, beverage manufacturing, pharmaceutical development, and biotechnology, where the handling of potentially hazardous fluids is common.

The unique feature of this clamp is its automatic locking mechanism coupled with a remote-controlled unlocking system, which can be either electronic or pneumatic. This design significantly enhances operational safety by minimizing the risks associated with the accidental opening of clamps that secure piping carrying dangerous fluids under pressure or at high temperatures.

DETAILED DESCRIPTION

This disclosure described herein addresses concerns related to the unintentional and/or controlled disassembly of a clamping device used to unify flanged piping sections that transport and hold fluids with potentially dangerous stored energy sources such as heat, chemicals, and pressure.

One solution involves a piping unification clamp equipped with an integrated, automatic locking and remotely operated unlocking mechanism.

The elements shown may take different forms of the components. The example components are not intended to be limiting, as alternative components and/or implementations may be used. The elements shown are not necessarily drawn to scale.

FIG. 1 through FIG. 4 illustrate an example of a hygienic clamp coupler 100 with an automatic locking and remote-controlled electronic unlocking mechanism. The hygienic clamp coupler is used to adjoin two flanged piping sections 115 and 120 in a sealed manner with an intervening gasket 325 illustrated in exploded view FIG. 3.

Figure 3:
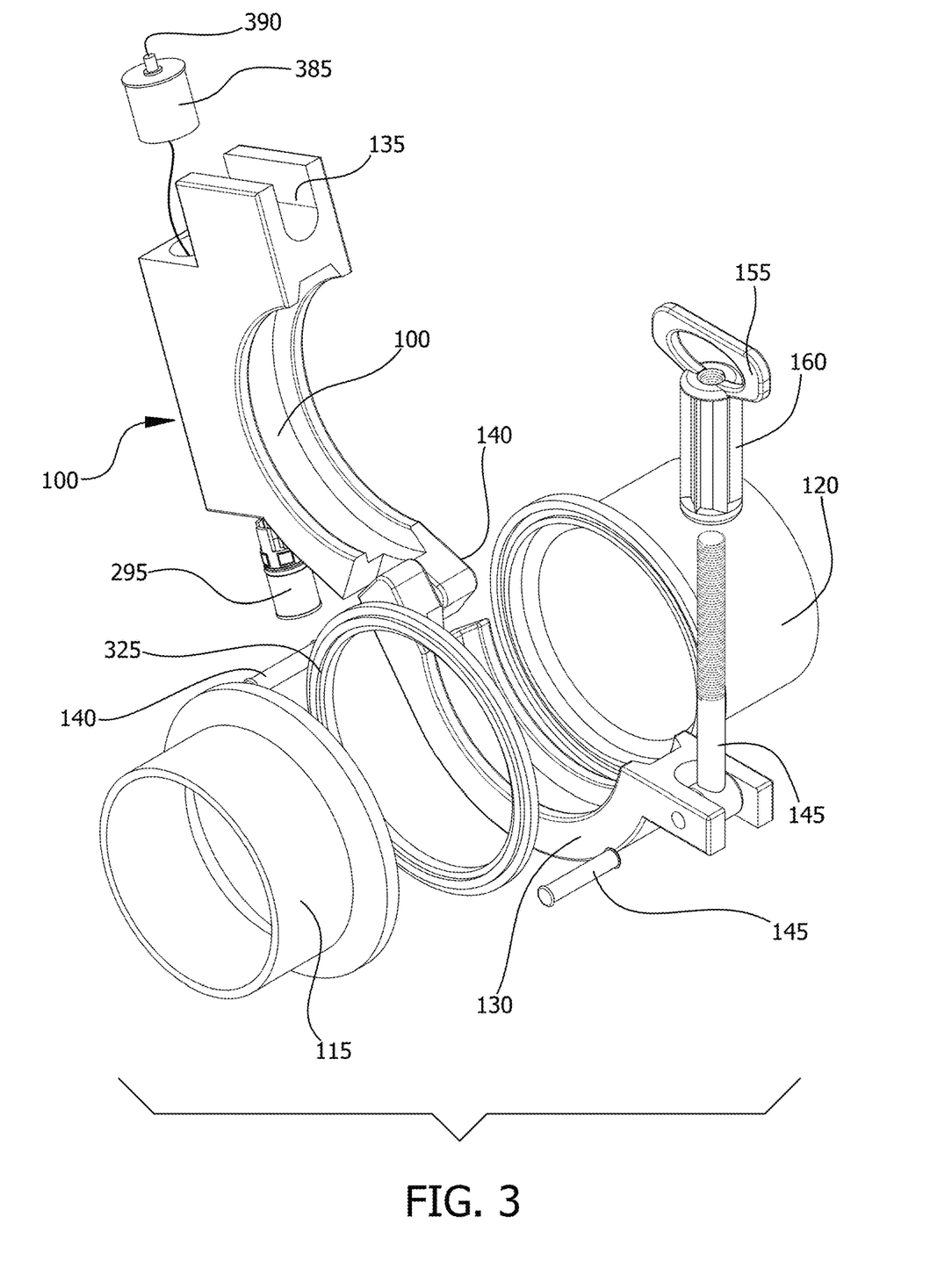
FIG. 3 illustrates an exploded perspective view of the hygienic clamp coupler in the open position, including the piping ferrules and intervening gasket.
Figure 4:
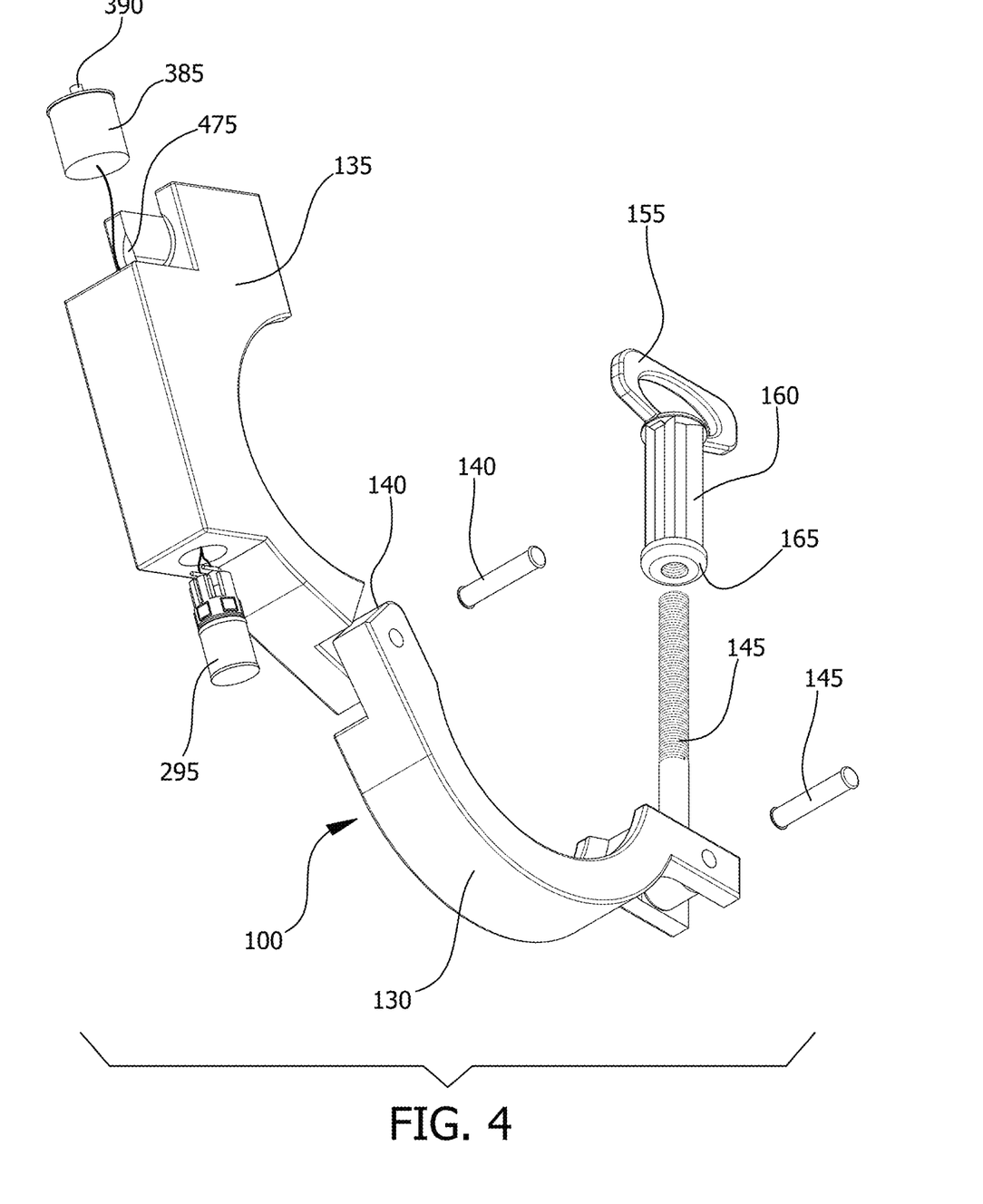
FIG. 4 illustrates another exploded perspective view of the hygienic clamp coupler in the open position.
Figure 5:
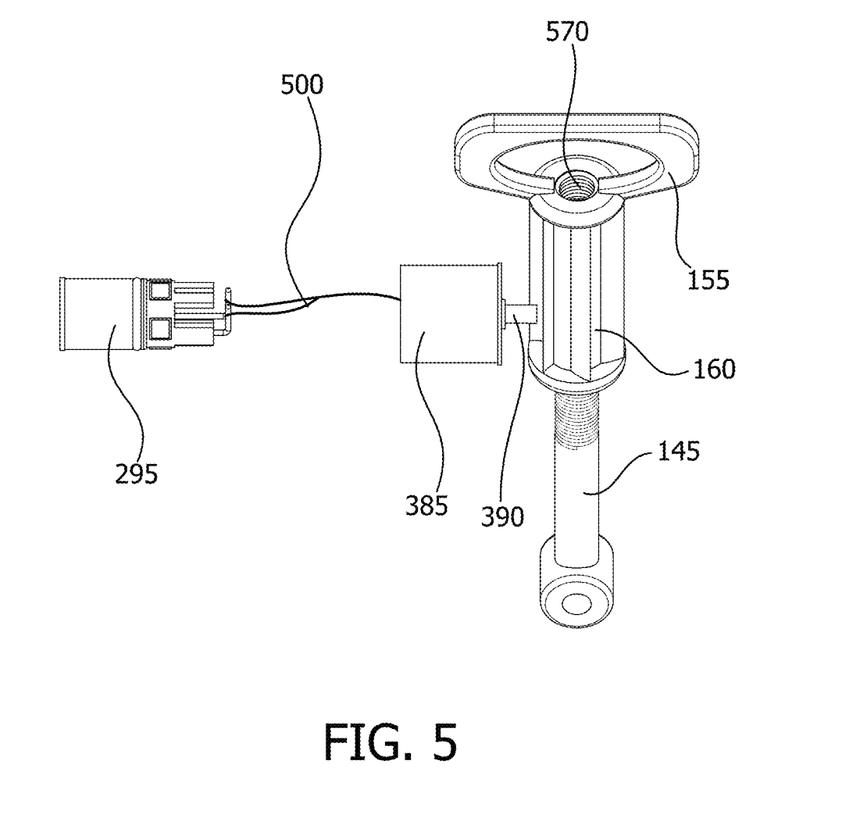
FIG. 5 illustrates the automatic locking and unlocking mechanisms of the clamp in a perspective view, emphasizing the details of these components.
Figure 6:
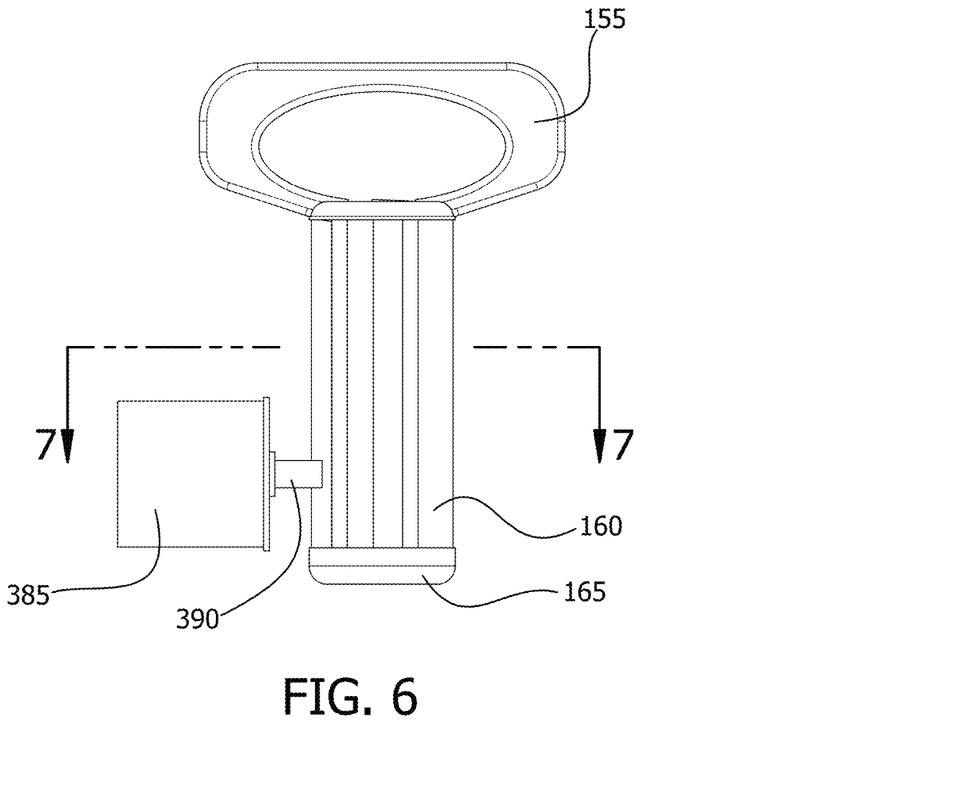
FIG. 6-FIG. 7 illustrates a sectional view of the automatic locking and unlocking mechanisms of the clamp.

The exploded views FIG. 3 and FIG. 4 illustrate in detail the hygienic clamp 100 of this example having an inner radius slotted groove split ring halves 130 and 135 accompanying flanged ends of the piping sections 115 and 120 with a proximal end articulating axially pinned joint 140. Opposite to the articulating axially pinned joint 140 at the distal ends, one ring half 130 has a threaded swing eyebolt 145 secured by an axial pin. The other ring half 135 has a receiving slot 150, where the swing eyebolt 145 is placed into when closing and securing the clamp around the abutted flanged piping sections 115 and 120 and intervening gasket 325. The outside surface perpendicular to the receiving slot has a detent 475, illustrated in FIG. 4.

A securing elongated wingnut 155 with an axially elongated ratchet gear feature 160, a semi-spherical push end 165, and an internal threaded bore 570 through the axial center of the wingnut, is threaded to the swing eyebolt 145. The securing wingnut 155 is moved towards the slotted ring half surface 150 by the operator rotating the wingnut clockwise. As the semi-spherical push end 165 mates with the horizontal surface detent 475 by continuing the clockwise rotation of the wingnut, the slotted groove clamp ring halves 130 and 135 close around the flanged piping sections 115 and 120, pushing the pipes towards the intervening gasket 325 creating a sealed circuit.

Figure 7:
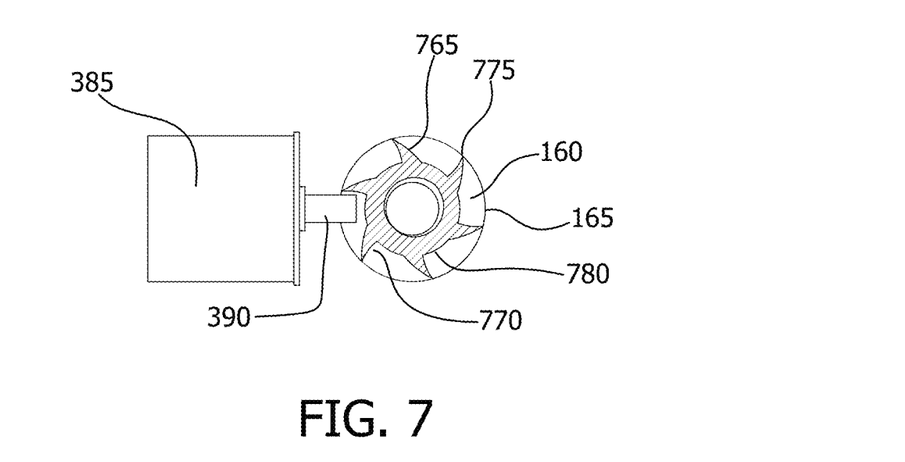

The ratchet gear 160 feature of the elongated securing wingnut 155 has asymmetrical teeth with each tooth having one surface side 765 gradually sloping towards the tooth top-land 775 and another surface side of each tooth having a steep slope 770 from the tooth top-land 775 to the bottom-land 780 of the gear illustrated in sectional view FIG. 7 in further geometric detail.

The slotted groove ring half 135 features an embedded electrically activated-to-pull spring-loaded linear actuator 385, where the linear actuator plunger pin 390 operates as a ratchet pawl to the mating ratchet gear 160 of the elongated securing wingnut 155. As the elongated securing wingnut 155 is moved towards the slotted ring half surface 150 by the operator rotating the wingnut clockwise, the gradually sloping ratchet gear teeth surfaces of the ratchet gear 160 push the spring-loaded embedded linear actuator 385 plunger pin 390 over the top-land 775 of the ratchet gear 160 teeth enabling free clockwise rotation of the elongated securing wingnut 155. After the spring-loaded linear actuator plunger pin ratchet pawl 390 clears the top-land 775 of the ratchet gear 160 teeth, the spring-loaded plunger pin 390 is pushed into the bottom-land 780 of the ratchet gear 160 by the plunger pin spring. When the securing wingnut 155 is rotated counter-clockwise, the steeply sloped surfaces 770 of the ratchet gear 160 teeth engage and jam parallelly with the linear actuator plunger pin 390 with a force vector that does not push the linear actuator plunger pin 390 over the top land 775 of the ratchet gear 160 teeth preventing the counter-clockwise rotation of the securing wingnut 155, and in turn preventing the operator from opening and removing the hygienic clamp coupler 100 from the flanged piping sections 115 and 120.

Electrical energy provided to the embedded electrically activated-to-pull spring-loaded linear actuator 385 moves the linear actuator plunger pin 390 away from the bottom-land 780 of the ratchet gear 160, disengaging the ratchet components and allowing the elongated securing wingnut 155 ratchet gear 160 to clear the plunger pin ratchet pawl 390 and to be rotated counter-clockwise by the operator and in turn enabling the operator to remove the hygienic clamp 100 from the piping sections 115 and 120.

Figure 1:
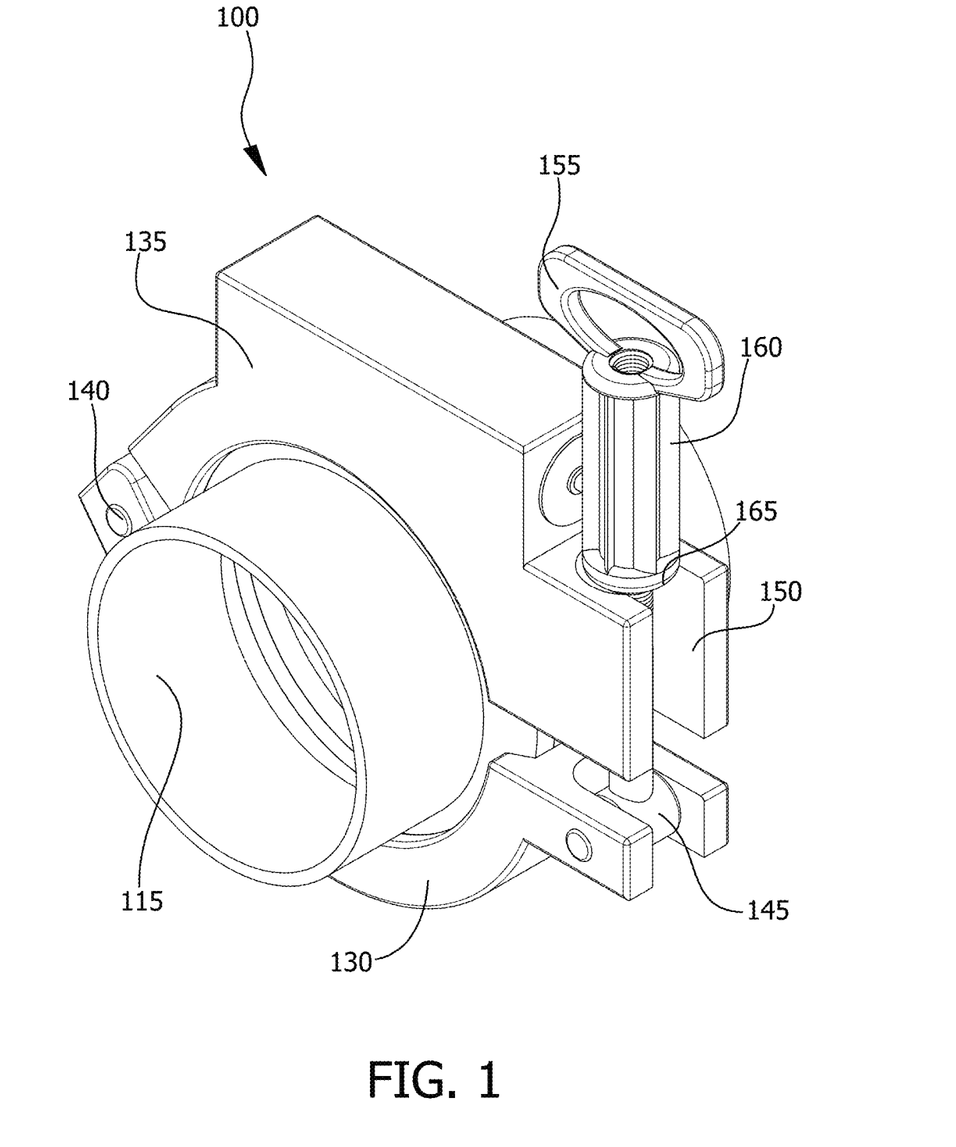
FIG. 1 illustrates a hygienic clamp coupler in a perspective view in the closed position coupling a piping circuit. This particular clamp incorporates an automatic locking mechanism and an electronic unlocking mechanism that is remote-controlled.
Figure 2:
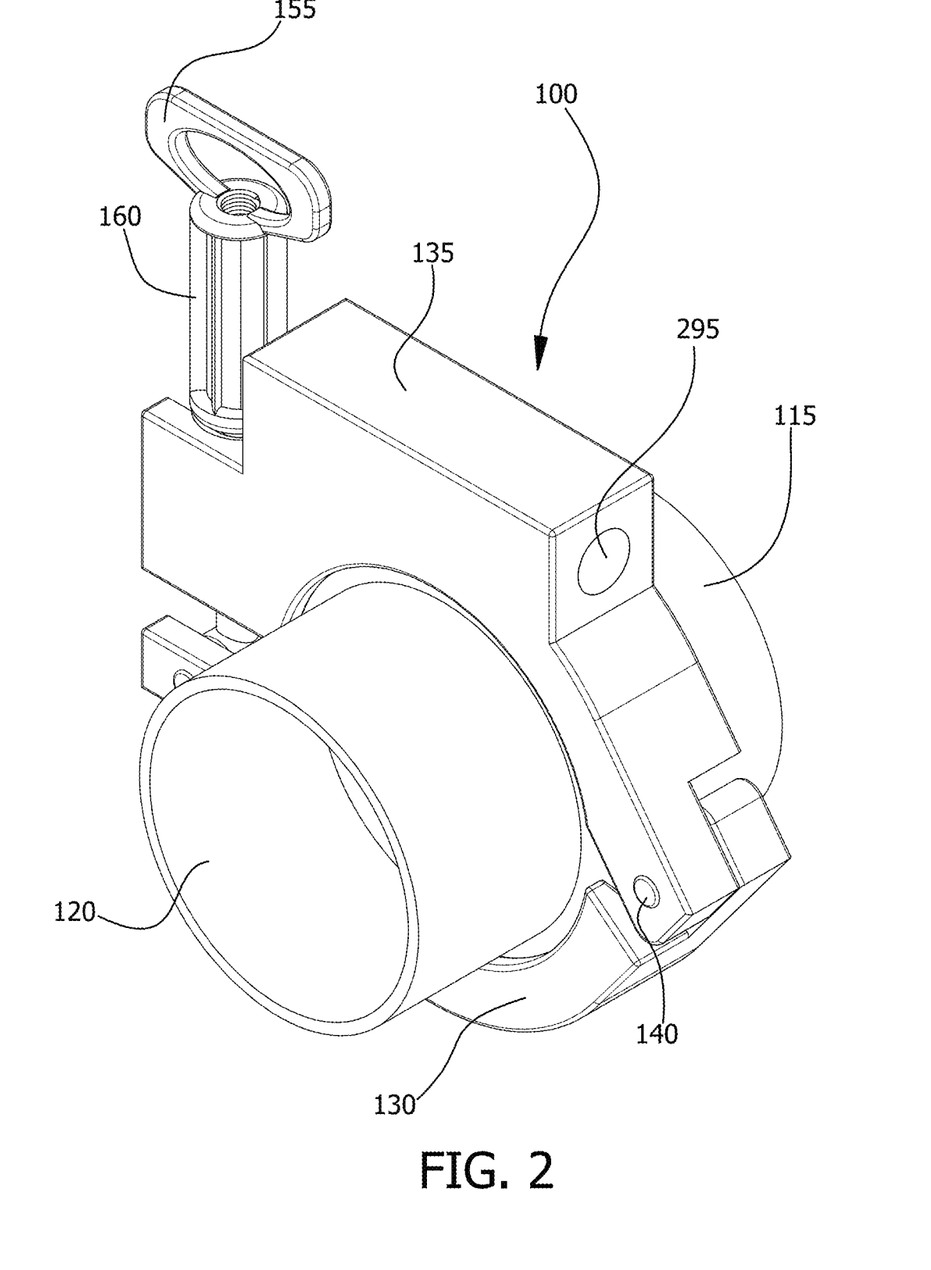
FIG. 2 illustrates the hygienic clamp coupler in the closed position and the coupled piping circuit from a different perspective view.

In a specific embodiment of the disclosure, the hygienic clamp coupler includes an electrical receptacle 295, designed to connect to a remote electrical signal source. The electrical receptacle 295 is internally electrically connected by electrical conductors 500 to the electrically activated-to-pull spring-loaded linear actuator 385 through an internal bore within the ring half 135. While this description focuses on a particular implementation involving the electrical receptacle, it should be understood that variations and modifications that achieve the same functionality are also encompassed within the scope of the disclosure.

Figure 8:
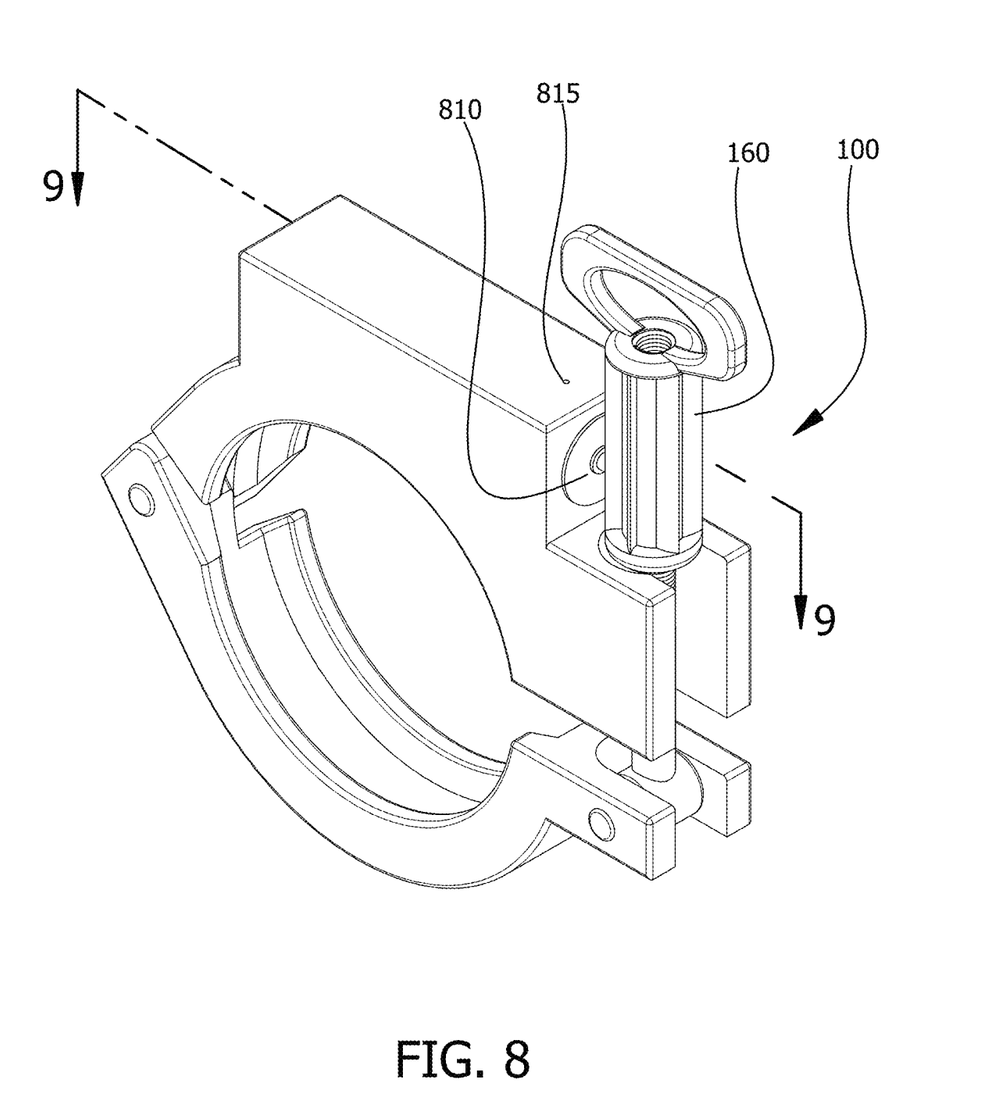
FIG. 8 illustrates an alternative embodiment of the hygienic clamp coupler in a perspective view in the closed position. This particular clamp incorporates an automatic locking mechanism and a pneumatic unlocking mechanism that is remote-controlled.
Figure 9:
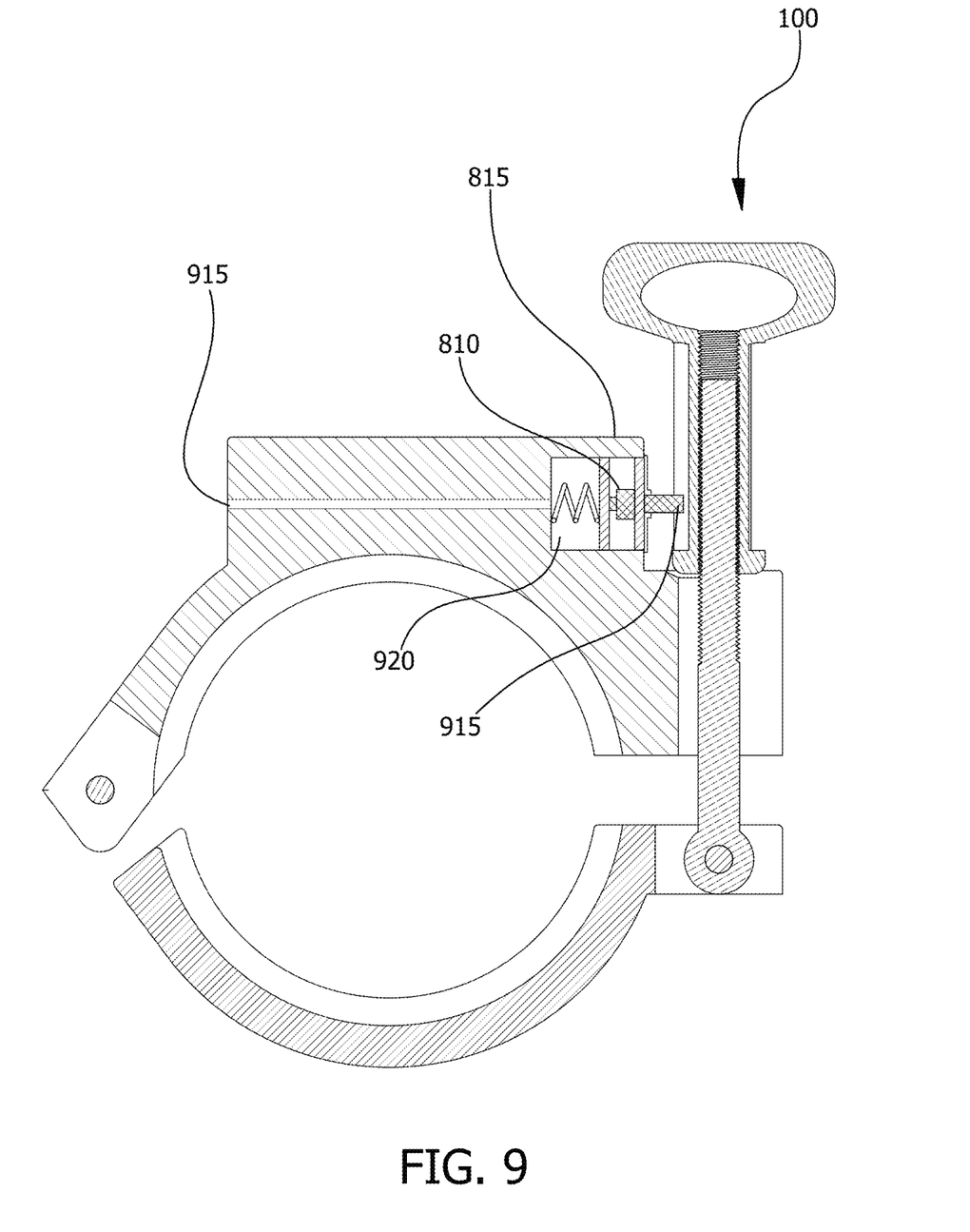
FIG. 9 illustrates a section view of the hygienic clamp coupler including the detailed components used for the alternatively embodied hygienic clamp and included pneumatic unlocking mechanism.

In an alternative embodiment of the present disclosure, the hygienic clamp 100 coupler may incorporate a linear pneumatic actuator 810 instead of the electrically activated-to-pull spring-loaded linear actuator 385. In this embodiment, the linear pneumatic actuator 810, when activated, would similarly retract a plunger pin 915 or equivalent component, disengaging the ratchet gear 160 and allowing for the unlocking and opening of the clamp 100. A pneumatic receptacle 815 connects a pneumatic airline from the remote air source to the hygienic clamp 100. A pneumatic vent 915 evacuates air from the low-pressure side of the linear pneumatic actuator 810 allowing for free movement of the actuator 810. An internal spring 920 provides a compression load to return the plunger pin 915 to the de-energized position. This embodiment is particularly advantageous in environments where pneumatic systems are preferable or more practical than electrical systems.

The invention claimed is:

1. A hygienic clamp coupler for adjoining two flanged piping sections, the coupler comprising:
    a locking mechanism; and
    a remote-controlled unlocking mechanism, wherein the unlocking mechanism is either an electronic unlocking mechanism or a pneumatic unlocking mechanism;
    inner radius slotted groove split ring halves designed to accommodate flanged ends of a piping circuit;
    an articulating axially pinned joint at a proximal end of the coupler;
    a threaded swing eyebolt secured by an axial pin on one ring half and a receiving slot on the opposite ring half for placement of the swing eyebolt;
    an elongated wingnut with an axially elongated ratchet gear feature, a semi-spherical push end, and an internally threaded bore for engagement with the swing eyebolt, wherein rotation of the wingnut facilitates closure of the ring halves around the flanged piping sections, pressing the pipes towards an intervening gasket to create a sealed piping circuit;
    a ratchet gear feature with asymmetrical teeth on the elongated wingnut;
    the electronic unlocking mechanism comprises an embedded electrically activated spring-loaded actuator or the pneumatic unlocking mechanism comprises an embedded pneumatic activated spring-loaded linear actuator in one ring half, wherein an actuator plunger pin of either the embedded electrically activated spring-loaded actuator or the embedded pneumatic activated spring-loaded linear actuator operates as a ratchet pawl to the mating ratchet gear, allowing for the locking of the clamp based on the direction of rotation of the wingnut;

a configuration wherein energy is provided to the linear actuator defining the remote-controlled unlocking mechanism to disengage the ratchet components, allowing for unlocking of the clamp and counter-clockwise rotation of the wingnut and removal of the clamp from the flanged piping sections.

2. The hygienic clamp coupler of claim 1, wherein:

the ratchet gear teeth on the elongated wingnut have a gradual slope on one side and a steep slope on the opposite side, facilitating unidirectional movement of the wingnut in a locking direction;

the actuator plunger pin engages with the steep sloped surface of the ratchet gear teeth to prevent counter-clockwise rotation and unlocking of the wingnut unless energetically actuated.

3. A method of securing and releasing flanged piping sections using a hygienic clamp coupler, according to claim 1, comprising:

rotating the elongated wingnut in a clockwise direction to engage the locking mechanism and seal the piping sections;

providing energy to the embedded linear actuator to move the plunger pin away from the ratchet gear, thereby disengaging the ratchet components;

rotating the elongated wingnut in a counter-clockwise direction following the disengagement of the ratchet components to release the clamp from the flanged piping sections.

* * * * *